June 12, 1934.  W. L. MORRISON  1,962,966
AIR DEFLECTOR FOR AUTOMOBILES
Filed Aug. 31, 1932  7 Sheets-Sheet 1
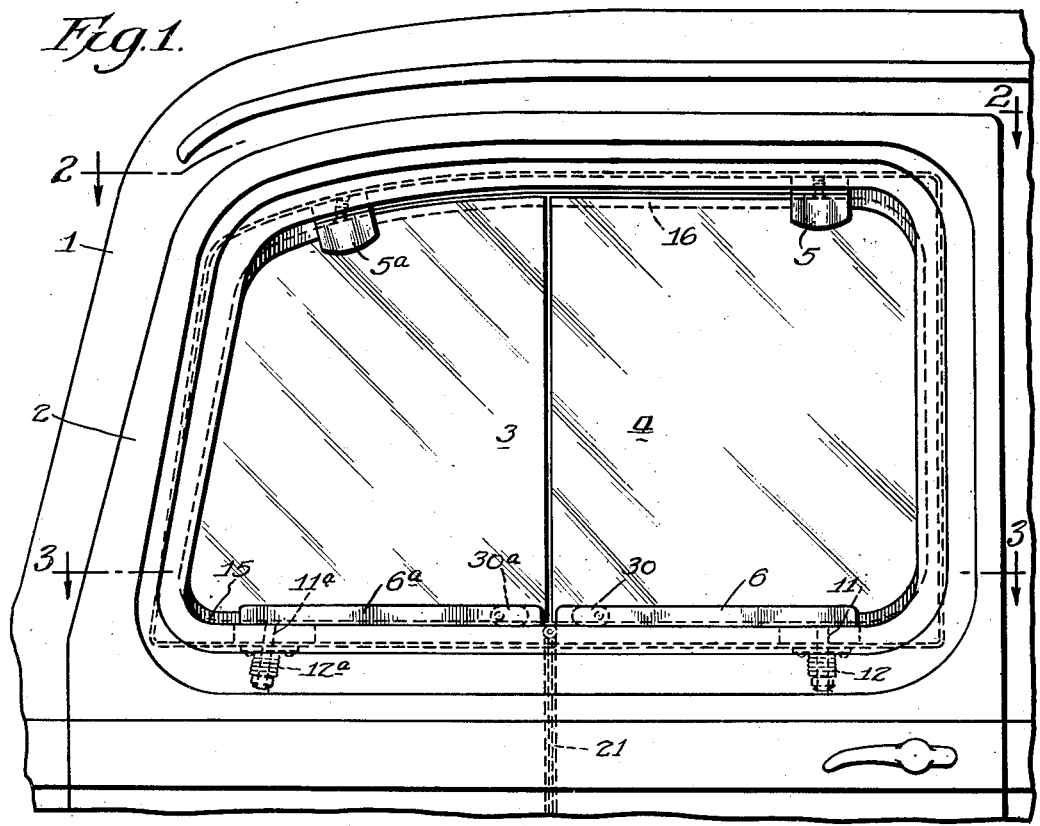
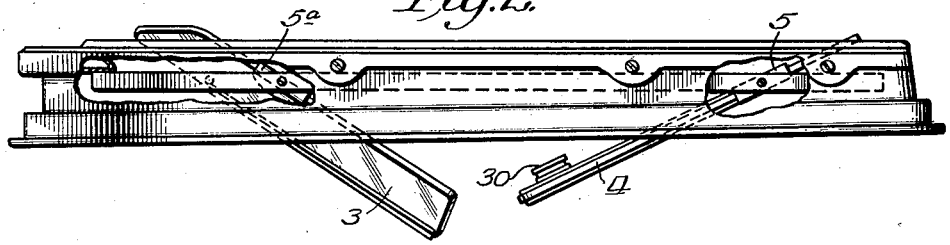
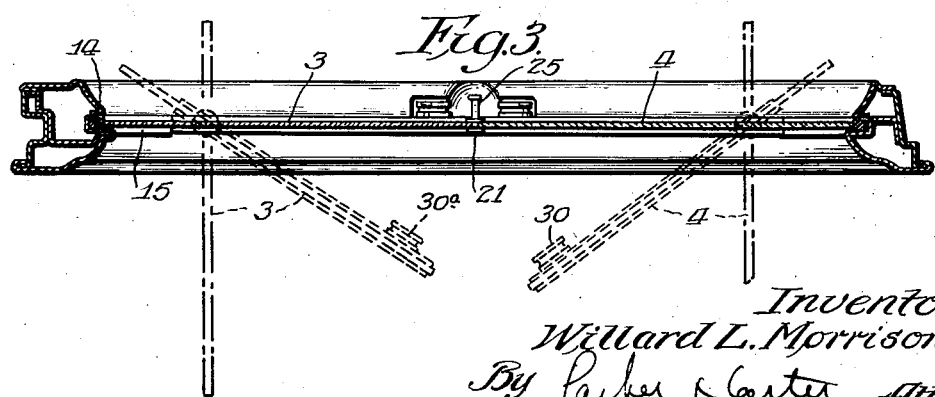
Inventor
Willard L. Morrison
By Parker & Carter Attys June 12, 1934. W. L. MORRISON 1,962,966
AIR DEFLECTOR FOR AUTOMOBILES
Filed Aug. 31, 1932 7 Sheets-Sheet 2
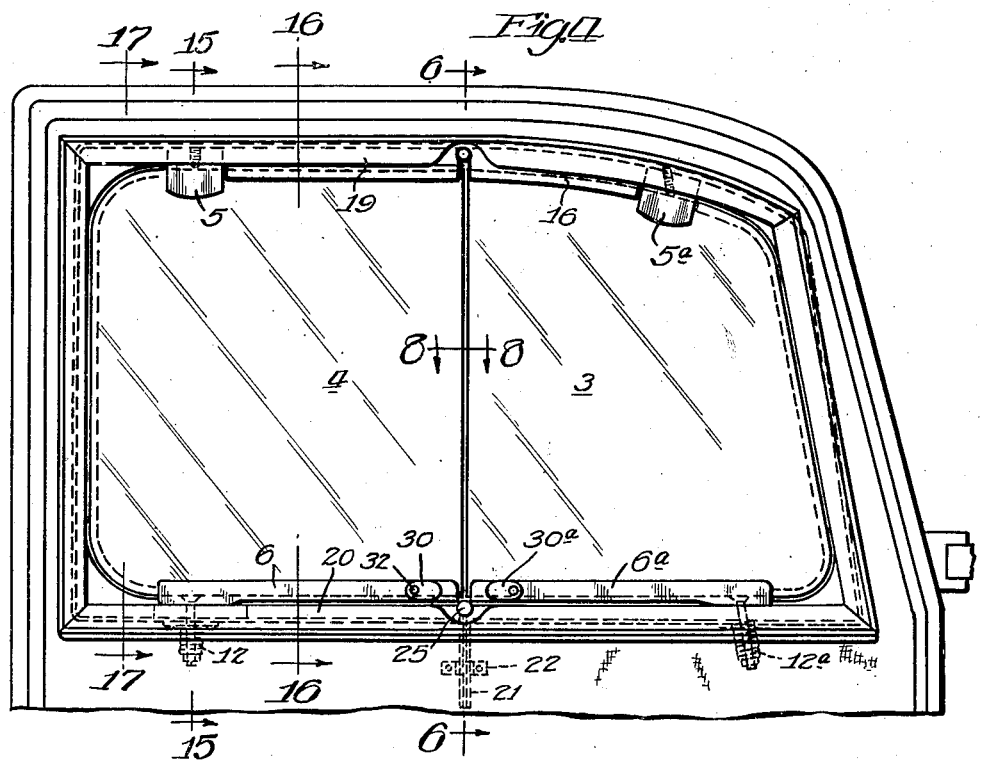
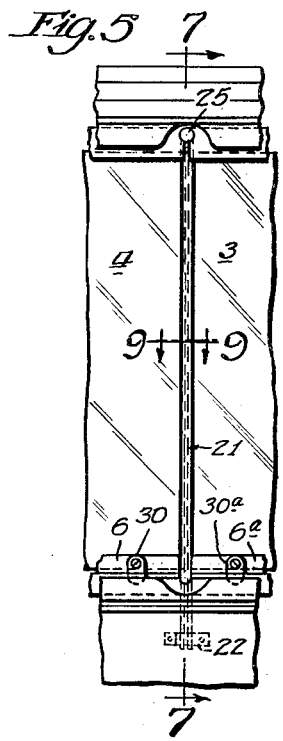
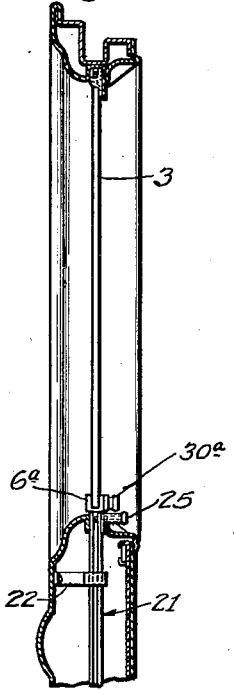
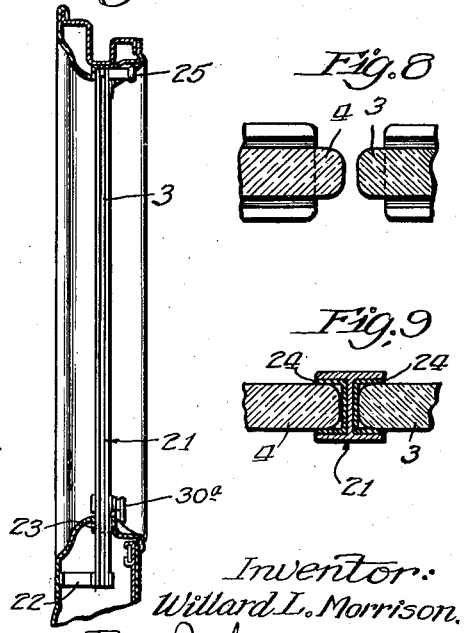
Inventor:
Willard L. Morrison.
By Parker & Carter attys

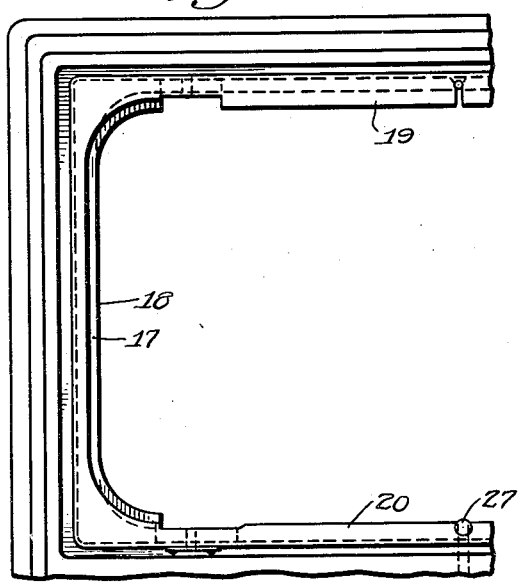
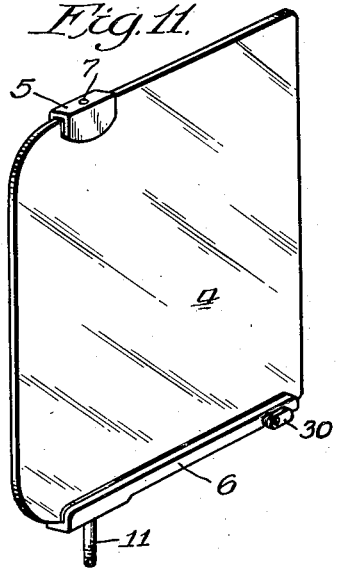
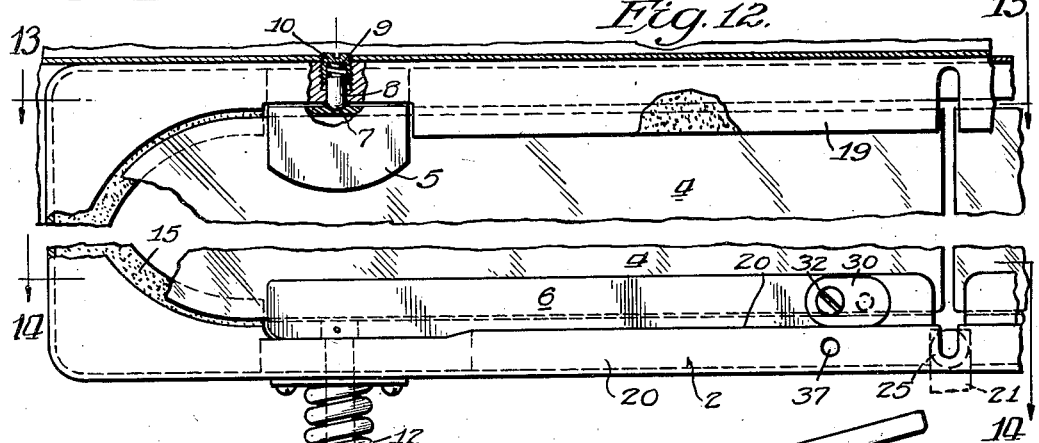
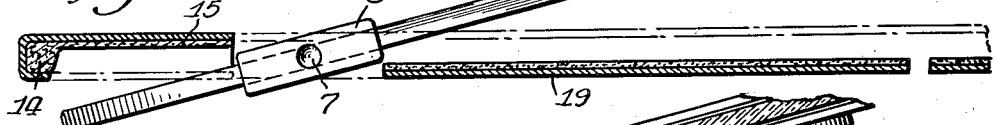
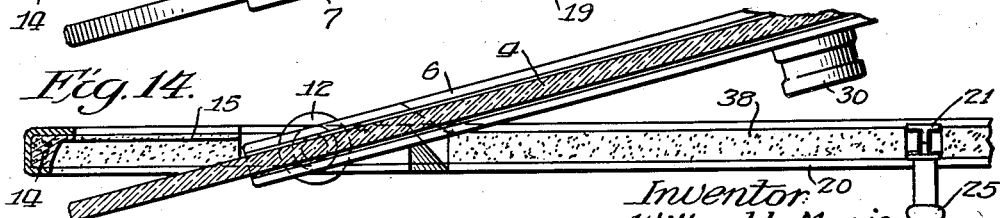

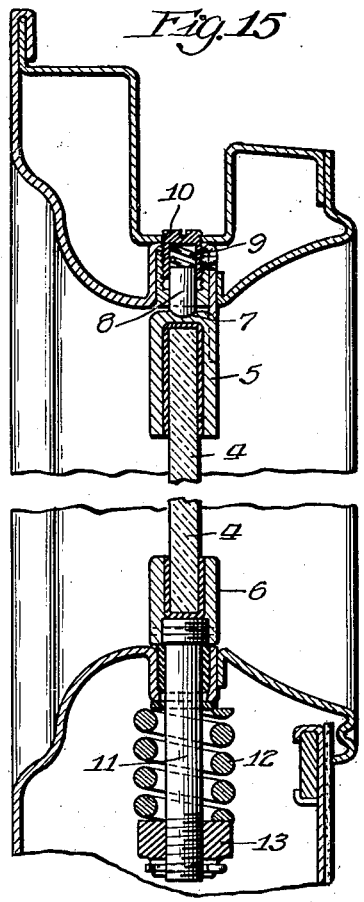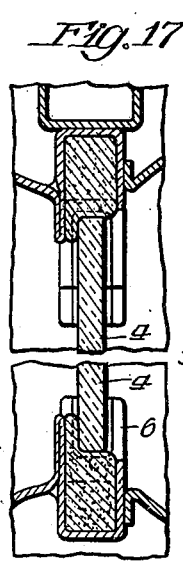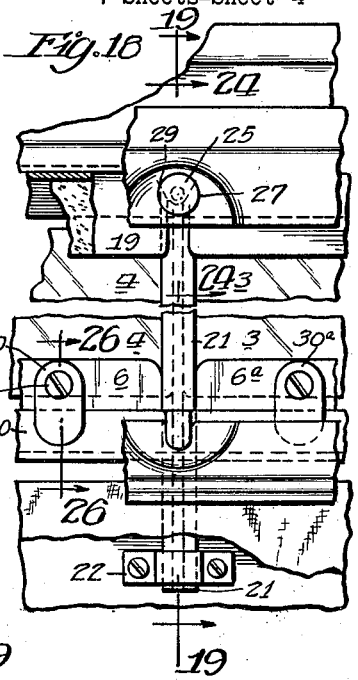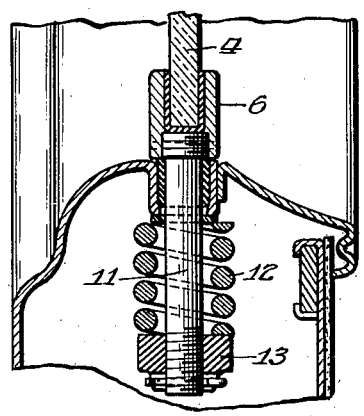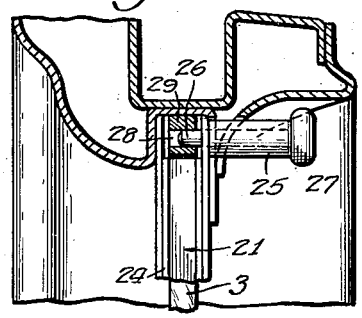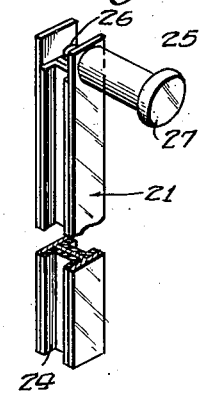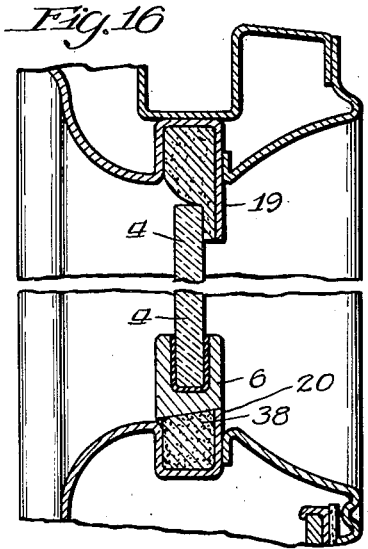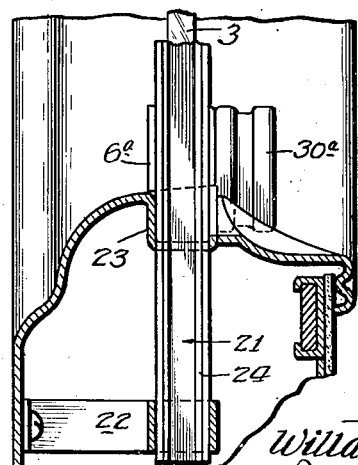

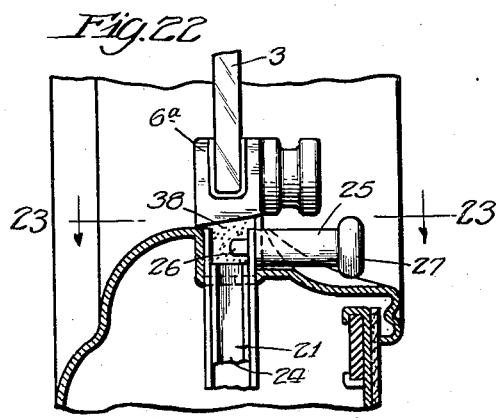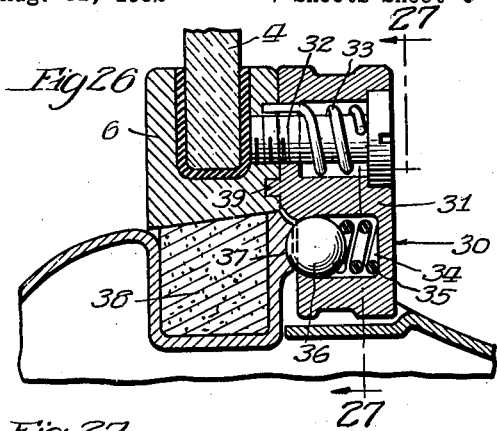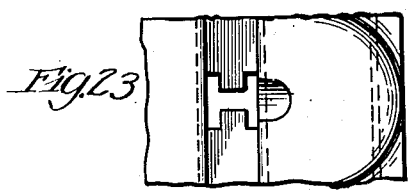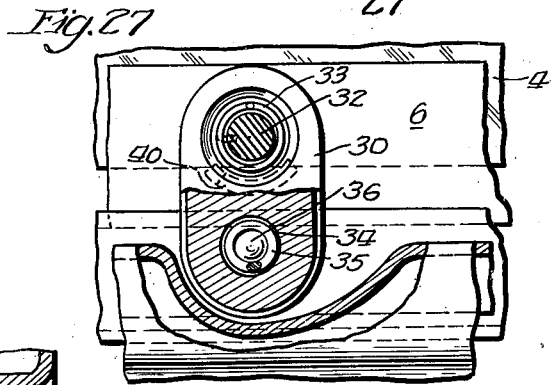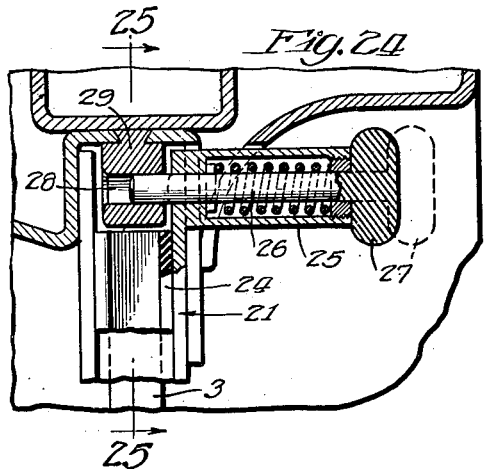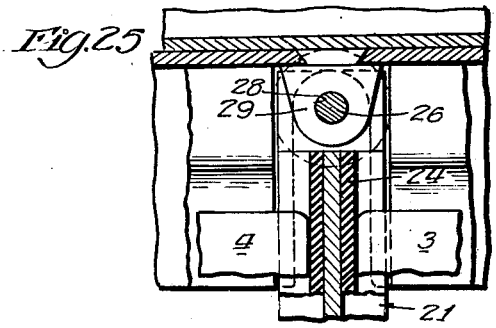

June 12, 1934. W. L. MORRISON 1,962,966
AIR DEFLECTOR FOR AUTOMOBILES
Filed Aug. 31, 1932 7 Sheets-Sheet 6
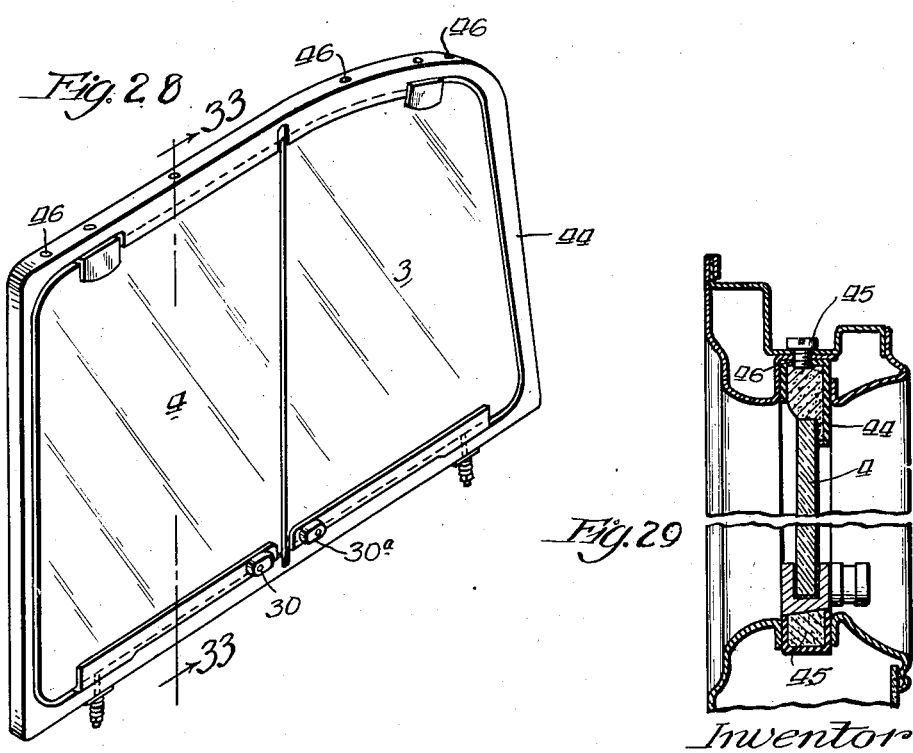
Inventor:
Willard L. Morrison
By Parker &  Attys.

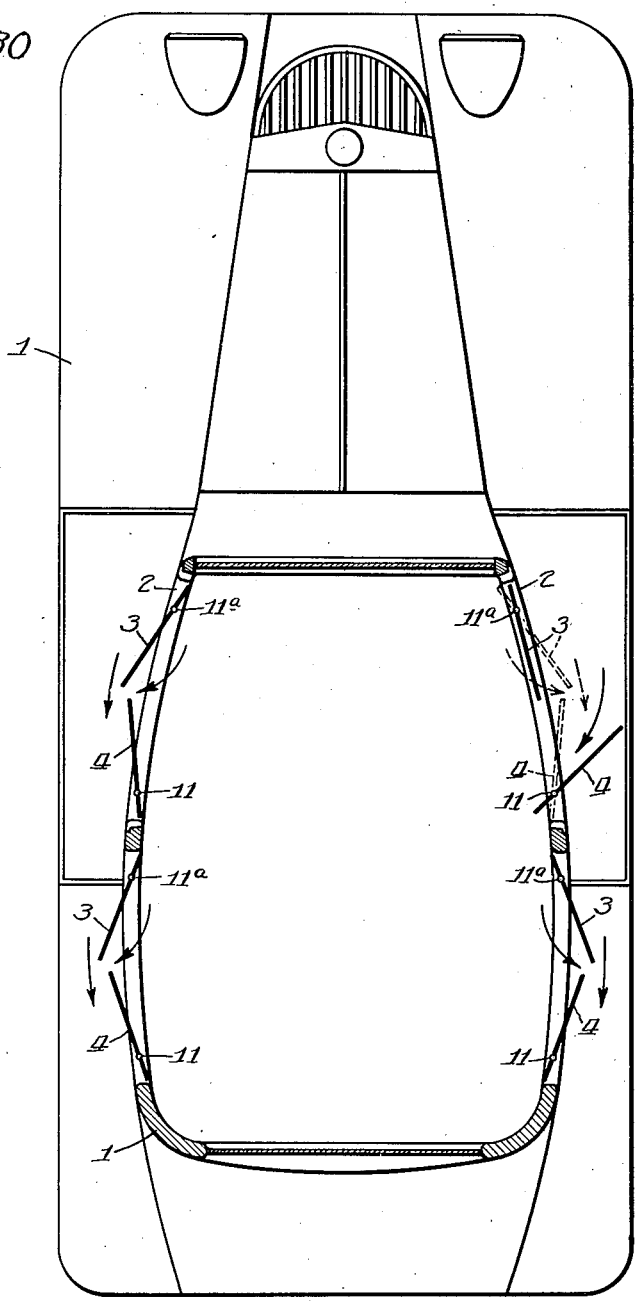

Patented June 12, 1934

1,962,966

UNITED STATES PATENT OFFICE 1,962,966

AIR DEFLECTOR FOR AUTOMOBILES

Willard L. Morrison, Chicago, Ill.

Application August 31, 1932, Serial No. 631,137

14 Claims. (Cl. 296—44)

This invention relates to air deflectors for automobiles and has for its object to provide a new and improved device of this description. The invention has as a further object to provide an air deflector for automobiles which shall take the place of the ordinary window of the car. The invention has as a further object to provide an air deflector for automobiles which shall be made in two sections and which can be tightly closed and sealed to make water tight joints. The invention has as a further object to provide an air deflector for automobiles to take the place of the ordinary window and which can be easily and quickly manipulated to provide an open window. The invention has as a further object to provide an air deflector for automobiles which can be used either as an air deflector or as a closed window. The invention has other objects which are more particularly pointed out in the accompanying description.

Referring now to the drawings, Fig. 1 is an outside view of a portion of a car showing the deflector in position with the two sections having their adjacent edges abutting;

Fig. 2 is a top view of the window frame or door as seen from line 2—2 of Fig. 1 with parts broken away and showing the sections of the deflector swung out on their pivots;

Fig. 3 is a sectional view taken on line 3—3 of Fig. 1 showing the various positions of the deflector in dotted lines;

Fig. 4 is an inside view similar to Fig. 1;

Fig. 5 is a fragmentary view of the abutting edges of the deflector with the sealing device in position;

Fig. 6 is a sectional view taken on line 6—6 of Fig. 4;

Fig. 7 is a sectional view taken on line 7—7 of Fig. 5;

Fig. 8 is an enlarged sectional view taken on line 8—8 of Fig. 4;

Fig. 9 is an enlarged sectional view taken on line 9—9 of Fig. 5;

Fig. 10 is a view of the inside of the window frame as shown in Fig. 4 with the moulding removed and the deflector removed;

Fig. 11 is a view of the rear deflecting section removed from the window;

Fig. 12 is an enlarged fragmentary inside view of the upper and lower portions of the deflector, the central portion being removed and parts being broken away;

Fig. 13 is a sectional view taken on line 13—13 of Fig. 12;

Fig. 14 is a sectional view taken on line 14—14 of Fig. 12;

Fig. 15 is an enlarged view taken on line 15—15 of Fig. 4 with parts broken away to show the pivot construction;

Fig. 16 is an enlarged sectional view taken on line 16—16 of Fig. 4 with parts broken away;

Fig. 17 is an enlarged sectional view taken on line 17—17 of Fig. 4 with parts broken away;

Fig. 18 is an enlarged view of Fig. 5 with the central part omitted;

Fig. 19 is a sectional view taken on line 19—19 of Fig. 18;

Fig. 20 is a perspective view, with parts broken away, of the sealing device for sealing the meeting edges of the deflector;

Fig. 21 is a side view of the upper portion of the sealing device;

Fig. 22 is an enlarged view of the lower portion of Fig. 6 showing the sealing device in its inoperative position;

Fig. 23 is a sectional view taken on line 23—23 of Fig. 22 showing the opening in the window frame for the sealing device;

Fig. 24 is an enlarged sectional view taken on line 24—24 of Fig. 14;

Fig. 25 is a sectional view taken on line 25—25 of Fig. 24;

Fig. 26 is a sectional view taken on line 26—26 of Fig. 18;

Fig. 27 is a sectional view taken on line 27—27 of Fig. 26;

Fig. 28 is a perspective view showing a modified construction where the deflector and the frame therefor is a unit;

Fig. 29 is an enlarged sectional view with parts broken away taken on line 33—33 of Fig. 28 with the device in position on a car;

Fig. 30 is a plan view in part section showing the deflector glasses in deflecting and scooping positions.

Like numerals refer to like parts throughout the several figures.

Referring now to the drawings, I have shown in Fig. 1 the front upper part 1 of an automobile closed body, having a wind shield inclined rearwardly from the bottom thereof toward the top the part nearer the roof being more rearwardly than the lower part, the automobile being a closed body, and the upper end 2 of the door. I have illustrated the air deflector in connection with this door. The air deflector comprises two plates of glass 3 and 4 properly shaped, these glasses mounted in a window opening which is surround- by a rigid casing. The glasses 3 and 4 are pivotally connected by similarly arranged devices to the window frame at the top and the bottom. Each glass has at the top a clamping piece 5 and 5a, and at the bottom clamping pieces 6 and 6a. The clamping piece 5 extends over the edge of the glass and is tightly fitted thereto. Any suitable pivotal connection is arranged between the clamping piece and the window frame. As herein shown this clamping piece has a recess 7, see Figs. 12 and 15. Connected with the window frame is a pin 8 which is pressed into the recess 7 by a spring 9 contained within a hollow nut 10. A similar arrangement is used in connection with the clamping piece 5a. This clamping piece 5a has the upper pivot connected therewith and there is a similar piece 6a at the bottom having the lower pivot 11a connected therewith. These pivots are located intermediate the front and rear edges of the glass 3 and are nearer the front edge than the rear edge so that when the glass is moved to an angular position there will be an open space at the front connecting the interior of the automobile with the exterior atmosphere as clearly shown in Figs. 2 and 3.

The clamping piece 6 has connected therewith a pin 11 which projects through the window frame. A spring 12 thereon engages the window frame or some part associated therewith, and a nut 13 on the pin may be screwed up to tighten the spring so as to make a frictional pivotal connection. The spring may be tightened sufficiently to cause enough friction to cause the glass to remain in any angular position into which it is moved. The glass 3 has a similar pin 11a and a spring 12a and nut 13a.

The two abutting edges of the glasses 3 and 4 may be moved outwardly to form any desired angle so that the glass 3 may act as a deflector Fig. 2 and the glass 4 as an air scooper to scoop air into the automobile, as shown in Fig. 13. These glasses may be moved to a substantially right angle position with relation to the frame, as shown in Fig. 3, so as to open up the window to permit packages to be passed in and out, or to permit people on the inside to talk with people on the outside, or for any other reason. The two glasses may be brought so that their adjacent edges are in alignment, as shown in Fig. 1 and in full lines in Fig. 3, to form a closed window.

Means is provided for making a tight joint when these glasses are in their closed positions. In the construction herein shown, the frame 2 is provided with a rubber gasket 14, see Fig. 3, against which the edge of the glass 3 tightly fits when the glass is in its closed position. There is also a rubber upstanding glass-engaging member 15 which engages the side of the glass so as to make a water tight joint. At the top there is a flange 16 against which the edge of the glass presses. The glass 4 has similar tight joint producing devices, as clearly shown in Fig. 10 where the glasses are removed. At the end of the frame is the rubber member 17 with the flange 18. At the top is the flange 19 and at the bottom is the flange 20, all arranged to form a water tight joint when the two glasses are in their closed positions.

Means is also provided for forming a water tight joint at the meeting edges of the glasses 3 and 4. As herein shown this joint is provided by a sealing member 21, see Figs. 1, 3, 5, 7, 9, 20 and 21. This sealing member is normally arranged so that it may be pushed down into the window sill out of the way, and there are guides 22 and 23 which guide it when it is moved up and down. This sealing member is herein shown as having an I-shape cross section, see Fig. 9, the web passing between the glasses 3 and 4. Rubber bushings 24 are connected with this member so as to engage the abutting edges of the glasses to form a tight joint. The sealing member is provided with a handle 25 by means of which it may be lifted up and down. To move it into position the glasses are arranged with their edges abutting, as shown in Figs. 1, 4 and 8, and then the handle is grasped and moved upwardly until its topmost position is reached. The handle is provided with a spring pressed pin 26, see Figs. 19, 24 and 25, which is moved outwardly by pulling on the knob 27 of the handle when the topmost position is reached, and then upon releasing it the pin enters a hole 28 in a locking piece 29 so as to hold the sealing member in its sealing position, as shown in Figs. 5, 7, 19, 24 and 25. The locking piece 29 is riveted or otherwise fastened to the window frame 2.

It will be seen that this sealing device is locked from the inside so that it is inaccessible from the outside. No one on the outside, therefore, can disconnect it. The glasses are also provided with inside locking members 30 and 31. One form of these locking members is illustrated in Figs. 26 and 27. The body portion 31 of the locking member has an opening therethrough for the fastening pivot screw 32 which is attached to the clamping piece 6. The hole through the locking device 30 is enlarged, and there is a spring 33 which has one end connected with the locking member 30 and the other with the screw 32. The locking member is also provided at its other end with a recess 34 into which is received a spring 35 which normally presses the holding member 36 outwardly. When the locking member 30 is in its inoperative position it is parallel with the clamping device 6, as shown in Fig. 1. When it is moved to its locking position it is moved to a position at right angles with the clamping member 6, as shown in Fig. 26, and the holding device 36 is pressed into a recess 37 in the window frame 2 which holds it in locked position.

At the bottom of the window frame is a beveled rubber gasket 38, and the clamping members 6 and 62 have beveled edges which engage the beveled edge of the rubber gasket, as shown in Fig. 26, when the window is closed so as to make a tight joint and prevent the window from being pushed inwardly. The locking members 30 prevent the window from being pushed or pulled outwardly. The locking members 30 have some means for limiting their movement about the pivotal screw 32. As herein shown they are each provided with a projection 39 which works in a slot 40 in the clamping members 6 and 6a. The slot is of the proper length so that the locking devices may be moved to their unlocked and their locked position but cannot be moved too far in either direction. The fastening devices 30 may also be used as handles for moving the windows in and out so as to avoid putting finger marks upon the windows.

Instead of having the glasses 3 and 4 attached to the window frame as shown in Figs. 1 and 4, I may attach these glasses to a separate frame 44, see Figs. 28 and 29. They may be attached to this separate frame in a similar manner and with similar water tight joint constructions as illustrated in Figs. 1 and 4. This frame 44 is then attached in position in the window frame 2 as by means of screws 45, see Fig. 29, which pass through the window frame and which engage screw holes 46 in the frame 44. In this construction the bottom of the frame 44 fits into the window frame, as shown in Fig. 3, and contains the inclined rubber gasket 45. In this construction when the glasses are in position they may be moved to any inclined position desired, and they may be moved separately or together. These glasses may also be moved to fully open the window, as shown in dotted lines in Fig. 3, or to their deflecting and scooping position as shown in Fig. 2. The glasses have their upper edges in proximity to the roof of the automobile and when they are moved to outwardly projecting angular positions inclined toward each other, they cooperate to provide an opening between them and the automobile body, opening upwardly as shown for example in Fig. 30, and the air passing along the roof of the automobile due, to the movement of the automobile, draws air out of the upper part of the automobile body through this opening. The size of this opening may be varied by moving the glasses to different angular positions. In Fig. 30 I have shown the automobile with the deflector glasses in various deflecting positions, the front glass 4 on the right side being shown in full lines in a scooping position. The glasses may also be moved to their closed positions, as shown in Figs. 1 and 4, and the sealing member 21 may then be moved to its sealing position, thereby making a water tight closed window which takes the place of the ordinary window in the car.

When the automobile is moving forward the glasses or pivoted sections 3 and 4 will be moved to some such position as shown in Fig. 2, with the rear end of the front glass 3 out somewhat farther than the front end of the rear glass 4. When the automobile is moving forward a current of air strikes the front glass 3 and is deflected by it past the opening between the glasses 3 and 4 and strikes the glass 4 back of the opening and is carried on back along the automobile. This moving current of air past the opening between the two glasses 3 and 4 causes air to be drawn out of the automobile without draft so as to properly ventilate it. The two sections 3 and 4 may be moved to any desired relative position to secure any desired result. If, for example, it is desired to scoop air into the automobile, the rear section 4 may be moved out farther than the front section 3, as shown in dotted lines in Fig. 3, to secure a fuller scooping action. The front section 3 may be moved to its closed position and the rear section 4 moved out any desired distance, as shown for example in Fig. 13 or in dotted lines in Fig. 3. These sections 3 and 4, due to the friction pivot at the bottom, will remain in any position to which they are moved, the current of air as the automobile travels forward having no effect in displacing them.

I claim:

1. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening and having meeting edges, and a sealing device for sealing the edges together to form a water tight joint, said sealing device being attached to a fixed part of the automobile, the sealing device engaging opposite faces of the glasses when in closed position.

2. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening and having meeting edges, and a sealing device for sealing the edges together to form a water tight joint, the pivotal mounting of each glass including a pin, a coil spring on said pin, a friction member against which the coil spring presses, and means for compressing the coil spring to provide a frictional pivotal connection and independent locking means for independently locking said glasses in their sealed position.

3. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening and having meeting edges, and a movable sealing device for sealing the edges together to form a water tight joint, said sealing device adapted to be moved down into a recess in the window frame so as to be out of the way.

4. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening and having meeting edges, and a sealing device movable relative to said glasses for sealing the meeting edges of the glasses together to form a water tight joint, and sealing means at the other edges of the glasses to form water tight joints at these edges when the glasses are in their closed position.

5. An air deflector for closed body automobiles having a window opening surrounded by a rigid casing forming a part of the automobile body, comprising two glasses which completely fill the window opening and form the permanent closure therefor, said glasses pivotally mounted intermediate their edges upon substantially vertical axes and having their upper edges in proximity to the roof of the automobile and being positioned in the window opening and adapted to be independently moved to different oppositely inclined angular positions to act as air deflectors and adapted to be moved with their edges adjacent to form a closed window of the automobile.

6. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening and having meeting edges, and a movable sealing device for sealing the edges together to form a water tight joint, said sealing device adapted to be moved down into a recess in the window frame so as to be out of the way, and means for sealing the other edges of the glasses to form water tight joints when the glasses are in their closed positions.

7. An air deflector for closed body automobiles having a window opening surrounded by a rigid casing forming a part of the automobile body, comprising two glasses forming the single permanent closure for the window opening, said glasses pivotally mounted adjacent their most widely separated edges upon substantially vertical axes, said glasses having their upper edges in proximity to the roof of the automobile and being positioned in the window opening and adapted to be independently moved to angular positions to act as air deflectors and adapted to be moved with their edges adjacent to form a closed window, independent means for holding the glasses in different angular positions with relation to each other, movable locking devices on the interior of said glasses for locking them in their closed positions.

8. An air deflector for closed body automobiles having a window opening surrounded by a rigid casing forming a part of the automobile body, comprising two glasses pivotally mounted in the window opening and adapted to be moved to angular positions to act as air deflectors and adapted to be moved with their edges adjacent to form a closed window, and a sliding sealing device having a portion which passes in between the two glasses, and engaging parts which engage the outer faces of the two glasses.

9. An air deflector for closed body automobiles having a window opening surrounded by a rigid casing forming a part of the automobile body, comprising two glasses, a separate frame having an opening in which said two glasses are mounted with their edges adjacent, frictional pivotal connections between the glasses and said frame, said frame movably fastened to the window frame.

10. An air deflector for closed body automobiles having a window opening surrounded by a rigid casing forming a part of the automobile body, comprising two glasses pivotally mounted intermediate their edges upon substantially vertical axes, said glasses having their upper edges in proximity to the roof of the automobile and being positioned in the window opening with their ends adjacent, said glasses having frictional pivotal connections with the window frame near their ends farthest from the adjacent ends so that they may be moved to different angular positions, the glasses when moved with their ends adjacent forming the ordinary window for the automobile.

11. An air deflector for closed automobiles having a window opening surrounded by a rigid casing, comprising two glasses pivotally mounted intermediate their edges and adjacent to their remote edges upon substantially vertical axes in said window opening and adapted to be moved to various angular positions to act as air deflectors and adapted to be moved with their edges adjacent to form a closed window, of the automobile.

12. An air deflector device for closed automobiles having a window opening surrounded by a rigid casing comprising two glasses, a front glass and a rear glass, both pivotally mounted upon substantially vertical axes in said window opening, the front section being pivotally mounted intermediate its ends, said glasses adapted to be moved to various angular positions to act as air deflectors, and means for independently holding said glasses in any of their various angular positions against the pressure of the flowing air, due to the forward movement of the automobile, said glasses adapted to be moved with their edges adjacent to form a closed window of the automobile.

13. An air deflector for closed body automobiles, having an inclined windshield and a window opening in proximity to said windshield, surrounded by a rigid casing a single window for said window opening, comprising two glasses pivotally mounted in said window opening upon substantially vertical axes and independently movable, the two glasses filling the window opening when closed, the forward glass being pivotally mounted intermediate its front and rear edges so that when moved to angular positions there will be open spaces at the front and rear edges connecting the inside of the automobile with the outside atmosphere, said glasses adapted to be moved to various oppositely inclined angular positions to act as air deflectors and adapted to be moved with these edges adjacent to form a closed window of the automobile.

14. An air deflector for closed body automobiles having a window opening surrounded by a rigid casing comprising two glasses, a front glass and a rear glass, both pivotally mounted in said window opening upon substantially vertical axes, the front section being pivotally mounted intermediate its ends, the upper edges of said glasses being in proximity to the roof of the automobile the two glasses when their adjacent edges are moved to outwardly projecting angular positions, inclining toward each other, forming an opening between the automobile body and the glasses; opening upwardly whereby the air passing along the roof due to the movement of the automobile draws air out of the upper part of the automobile body through said opening.

WILLARD L. MORRISON.